US007433773B2

(12) United States Patent
Tengler et al.

(10) Patent No.: US 7,433,773 B2
(45) Date of Patent: Oct. 7, 2008

(54) VEHICLE ON-BOARD UNIT

(75) Inventors: Steve Tengler, Grosse Pointe Park, MI (US); Ronald Heft, Farmington Hills, MI (US)

(73) Assignee: Nissan Technical Center North America, Inc., Framington Hills, MI (US)

( * ) Notice: Subject to any disclaimer, the term of this patent is extended or adjusted under 35 U.S.C. 154(b) by 471 days.

(21) Appl. No.: 11/246,177

(22) Filed: Oct. 11, 2005

(65) Prior Publication Data

US 2007/0083296 A1 Apr. 12, 2007

(51) Int. Cl.
*H04Q 7/20* (2006.01)

(52) U.S. Cl. ....................................... 701/100; 455/450

(58) Field of Classification Search ..................... 701/1, 701/33; 713/170, 172; 455/450, 452.2, 453, 455/500, 509, 510, 528
See application file for complete search history.

(56) References Cited

U.S. PATENT DOCUMENTS

| | | | | |
|---|---|---|---|---|
| 6,115,613 | A * | 9/2000 | Jonsson | 455/519 |
| 6,397,145 | B1 | 5/2002 | Millington | |
| 6,526,282 | B1 * | 2/2003 | Kadoshima et al. | 455/453 |
| 6,721,632 | B2 * | 4/2004 | Fallenstein | 701/1 |
| 6,801,777 | B2 * | 10/2004 | Rusch | 455/452.2 |
| 7,006,831 | B2 * | 2/2006 | Matz et al. | 455/453 |
| 2004/0072574 | A1 * | 4/2004 | Matz et al. | 455/453 |

OTHER PUBLICATIONS

Vehicle Safety Communications Project, Task 12 Final Task Report; Oct. 2004; National Highway Traffic Safety Administration, U.S. Department of Transportation, Washington, D.C., U.S.A.
Vehicle Safety Communications Project, Task 3 Final Report; Mar. 2005; National Highway Traffic Safety Administration, U.S. Department of Transportation, Washington, D.C., U.S.A.

* cited by examiner

*Primary Examiner*—Dalena Tran
(74) *Attorney, Agent, or Firm*—Global IP Counselors, LLP

(57) ABSTRACT

A vehicle on-board unit comprises a short range wireless broadcasting section, a vehicle identifier receiving section, a vehicle identifier counting section and a communication congestion determining section. The short range wireless broadcasting section is configured to broadcast a host vehicle identifier of a host vehicle equipped with the vehicle on-board unit. The vehicle identifier receiving section is configured to receive neighboring vehicle identifiers relating to neighboring vehicles located within a prescribed communication region around the host vehicle. The vehicle identifier counting section is configured to determine a number of the neighboring vehicle identifiers received by the vehicle identifier receiving section within a prescribed period of time. The communication congestion determining section is configured to determine a congestion condition of short range wireless communications within the prescribed communication region based on the number of the neighboring vehicle identifiers determined in the vehicle identifier counting section.

16 Claims, 8 Drawing Sheets

VEHICLE ON-BOARD UNIT

BACKGROUND OF THE INVENTION

1. Field of the Invention

The present invention generally relates to a vehicle on-board unit. More specifically, the present invention relates to a vehicle on-board unit configured to determine a congestion condition of short range wireless communications.

2. Background Information

Recently, vehicles are being equipped with a variety of informational systems such as navigation systems, Sirius and XM satellite radio systems, two-way satellite services, built-in cell phones, DVD players and the like. These systems are sometimes interconnected for increased functionality. Various informational systems have been proposed that use wireless communications between vehicles and between infrastructures, such as roadside units. These wireless communications have a wide range of applications ranging from crash avoidance to entertainment systems. The type of wireless communications to be used depends on the particular application. Some examples of wireless technologies that are currently available include digital cellular systems, Bluetooth systems, wireless LAN systems and dedicated short range communications (DSRC) systems.

Dedicated short range communications (DSRC) is an emerging technology that has been recently investigated for suitability in vehicles for a wide range of applications. DSRC technology will allow vehicles to communicate directly with other vehicles and with roadside units to exchange a wide range of information. In the United States, DSRC technology will use a high frequency radio transmission (5.9 GHz) that offers the potential to effectively support wireless data communications between vehicles, and between vehicles, roadside units and other infrastructure. The important feature of DSRC technology is that the latency time between communications is very low compared to most other technologies that are currently available. Another important feature of DSRC technology is the capability of conducting both point-to-point wireless communications and broadcast wireless messages in a limited broadcast area.

Accordingly, DSRC technology can be used to provide various information between vehicles, such as providing GPS location, vehicle speed and other vehicle Parameter Identifiers (PIDs) including engine speed, engine run time, engine coolant temperature, barometric pressure, etc. When communications are established from one vehicle to other vehicles in close proximity, this information would be communicated between the vehicles to provide the vehicles with a complete understanding of the vehicles in the broadcast area. This information then can be used by the vehicles for both vehicle safety applications and non-safety applications.

In vehicle safety applications, a "Common Message Set" (CMS) would mostly likely be developed in which a prescribed set of vehicle Parameter Identifiers (PIDs) are broadcast by each vehicle to give relevant kinematical and location information such as GPS location/vehicle position, vehicle speed, vehicle dimensions etc. Once a potential safety concern is determined to exist, a warning system in the vehicles would notify the driver of the potential safety concern so that the driver can take the appropriate action.

In order to enable direct communications among vehicles, DSRC technology supports ad hoc operation mode in which the vehicles directly communicate each other within a communication region without the use of an access point. However, in the wireless ad hoc network system, the network performance tends to decrease when there is localized high-usage of data channel. In other words, DSRC network will most likely experience system congestion in a high volume traffic area where the number of vehicles transmitting DSRC signals is high, and thus, the system capability of the DSRC network will decrease in such area.

The system congestion in the wireless ad hoc network is caused by the hidden terminal problem. The hidden terminal problem occurs when two terminals (e.g., first and second vehicles) that are out of range of one another wish to send data to a third terminal (e.g., a third vehicle). Since the first and second vehicles are out of range of one another, the first and second vehicles could not sense the activities of each other. Thus, when the first and second vehicles try to send the data to the third vehicle, it causes frame collision and data is lost. Since the probability of frame collision increases as the number of vehicles transmitting DSRC signals within the communication region increases, localized congestion in DSRC system becomes high as the number of vehicles transmitting DSRC signals within the communication region increases.

In view of the above, it will be apparent to those skilled in the art from this disclosure that there exists a need for an improved vehicle on-board unit. This invention addresses this need in the art as well as other needs, which will become apparent to those skilled in the art from this disclosure.

SUMMARY OF THE INVENTION

It has been discovered that localized high-usage of the CMS can create congestion of the channel, and intelligent protocols (e.g., scale back on broadcast power/distance and/or update rate of the CMS) upon recognition of congestion have been proposed as solutions to the DSRC system congestion. However, how to determine the DSRC system congestion condition has not been discussed or proposed in the recent investigation.

Accordingly, one object of the present invention is to provide a vehicle on-board unit configured and arranged to determine a congestion condition of short range wireless communications within a prescribed communication region and to inform the DSRC system capability to the user based on the determined congestion condition.

In order to achieve the above mentioned and other objects of the present invention, a vehicle on-board unit is provided that comprises a short range wireless broadcasting section, a vehicle identifier receiving section, a vehicle identifier counting section and a communication congestion determining section. The short range wireless broadcasting section is configured to broadcast a host vehicle identifier of a host vehicle equipped with the vehicle on-board unit. The vehicle identifier receiving section is configured to receive neighboring vehicle identifiers relating to neighboring vehicles located within a prescribed communication region around the host vehicle. The vehicle identifier counting section is configured to determine a number of the neighboring vehicle identifiers received by the vehicle identifier receiving section within a prescribed period of time. The communication congestion determining section is configured to determine a congestion condition of short range wireless communications within the prescribed communication region based on the number of the neighboring vehicle identifiers determined in the vehicle identifier counting section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
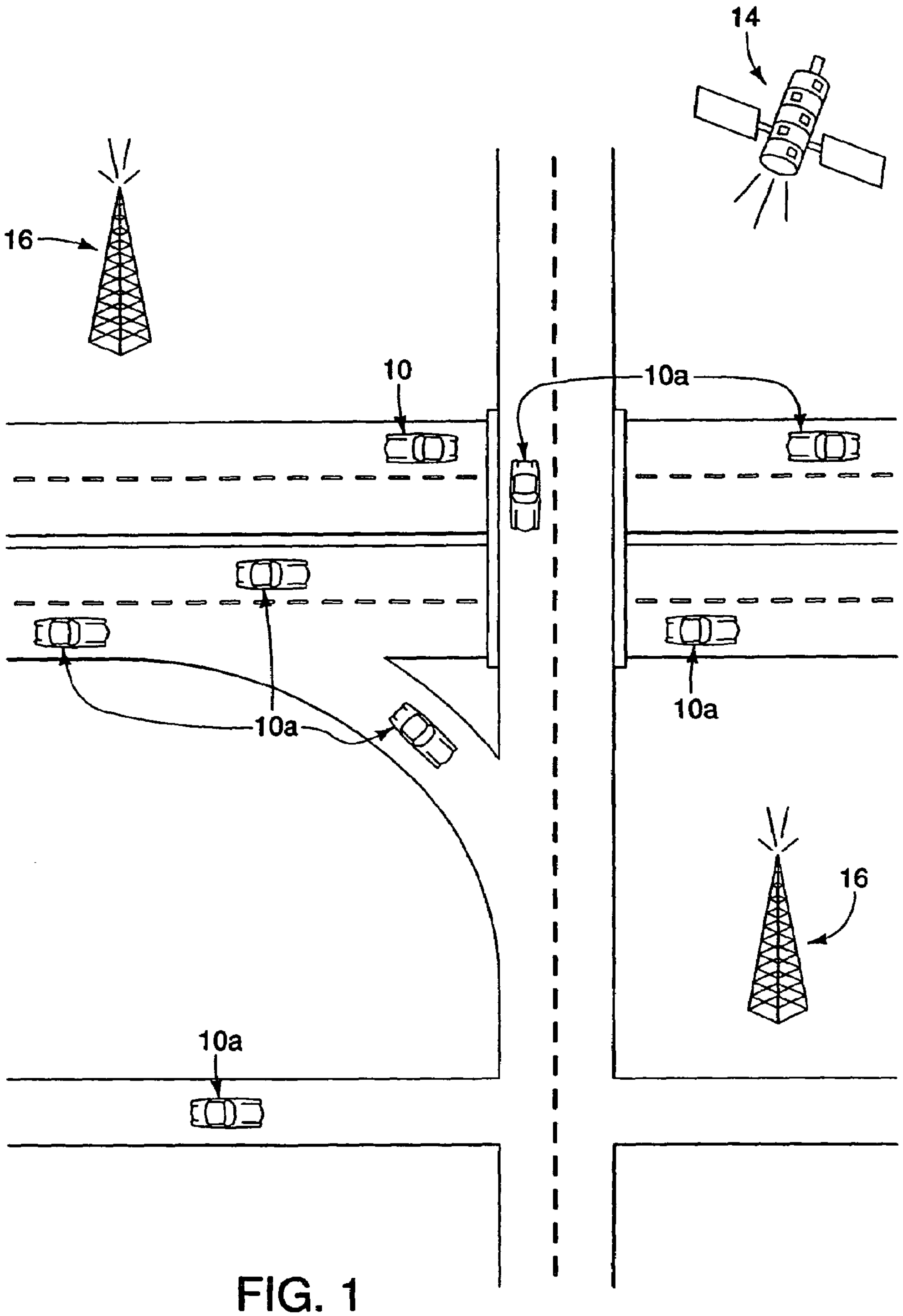
FIG. 1 is a pictorial representation of a two-way wireless communications (DSRC) network showing a plurality of vehicles each being equipped with a vehicle on-board unit capable of conducting two-way wireless communications in accordance with the present invention.
Figure 2:
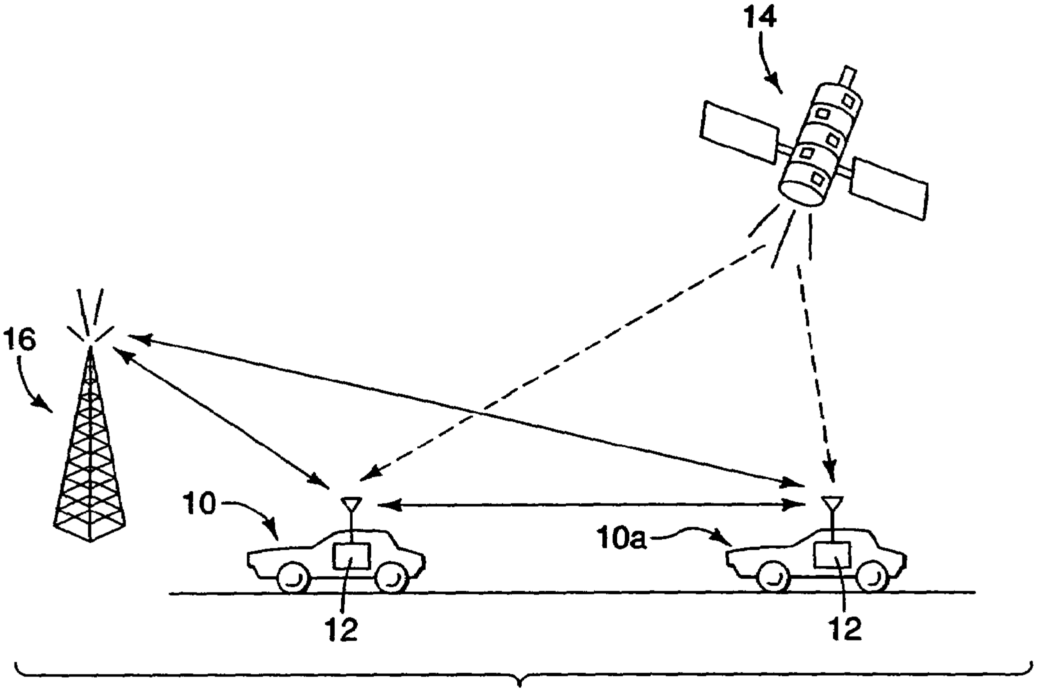
FIG. 2 is a pictorial representation of a two-way wireless communications (DSRC) network showing a pair of vehicles broadcasting vehicle identifiers and receiving information from a satellite and/or a roadside unit in accordance with the present invention.

Referring initially to FIGS. 1 and 2, a two-way wireless communications network is illustrated in which a host vehicle 10 and several neighboring or nearby vehicles 10*a* are each equipped with a vehicle on-board unit 12 in accordance with a preferred embodiment of the present invention. The two-way wireless communications network also includes one or more global positioning satellites 14 (only one shown) and one or more roadside units 16 (only two shown) that send and receive signals to and from the vehicles 10 and 10*a*. In this system, the term "host vehicle" refers to a vehicle among a group of DSRC equipped vehicles or vehicles equipped with two-way wireless communications in which a congestion condition determination processing is carried out in accordance with the present invention. The term "neighboring vehicle" refers to vehicles equipped with two-way wireless communications that are located within a communication (broadcasting/receiving) area surrounding the host vehicle in which the host vehicle is capable of either broadcasting a signal to another vehicle within a certain range and/or receiving a signal from another vehicle within a certain range.

The vehicle on-board unit 12 of the host vehicle 10 is configured and arranged to communicate with other DSRC equipped vehicles 10*a* and exchange information such as vehicle identifier with the neighboring vehicles 10*a*. More specifically, as seen in FIG. 2, the vehicle on-board unit 12 of each of the vehicles 10 and 10*a* carries out two-way wireless communications between each other as well as with one or more global positioning satellites 14 (only one shown) and one or more roadside units 16 (only one shown). The global positioning satellites 14 and the roadside units 16 are conventional components that are known in the art. The roadside units 16 are equipped with a DSRC unit for broadcasting and receiving signals to the vehicles 10 located with communication (broadcasting/receiving) regions surrounding the roadside units 16. Since global positioning satellites and roadside units are known in the art, the structures of the global positioning satellites 14 and the roadside units 16 will not be discussed or illustrated in detail herein. Rather, it will be apparent to those skilled in the art from this disclosure that the global positioning satellites 14 and the roadside units 16 can be any type of structure that can be used to carry out the present invention.

Figure 3:
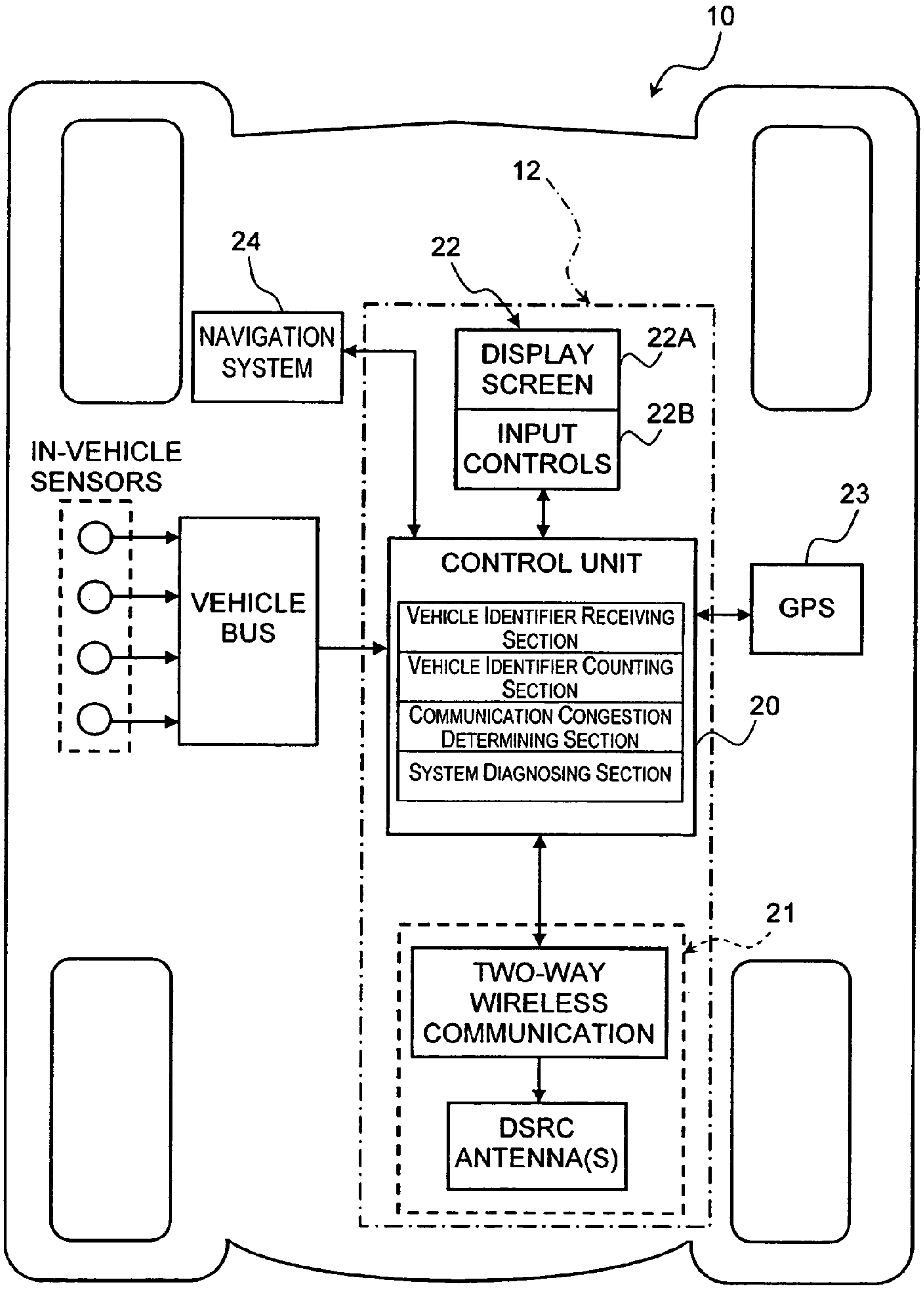
FIG. 3 is a schematic representation of one of the vehicles that is equipped with the vehicle on-board unit for conducting two-way wireless communications in accordance with the present invention.

Referring now to FIG. 3, the vehicle on-board unit 12 basically includes a controller or control unit 20, a two-way wireless communications system 21, a display section 22, a global positioning system (GPS) 23, and a navigation system 24. These systems or components are configured and arranged such that the control unit 20 receives and/or sends various signals to the other component and systems to determine a congestion condition of the DSRC system. In particular, the control unit 20 is configured and/or programmed to carry out this process by executing the steps shown in the flowcharts of FIGS. 6 to 8 (discussed below) in conjunction with various signals to and from the other components and systems. It will be apparent to those skilled in the art from this disclosure that the neighboring vehicles 10*a* are also equipped in the same manner as the host vehicle 10 and perform the same processes as described herein.

The control unit 20 preferably includes a microcomputer with a congestion condition determining program in accordance with the present invention. The control unit 20 also preferably includes other conventional components such as an input interface circuit, an output interface circuit, and storage devices such as a ROM (Read Only Memory) device and a RAM (Random Access Memory) device. The memory circuit stores processing results and control programs such as ones for operation of the two-way wireless communications system 21, the global positioning system 23 and the navigation system 24 that are run by the processor(s). The control unit 20 is capable of selectively controlling any of the components of the vehicle on-board unit 12 as needed and/or desired. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 20 preferably includes a program that has a vehicle identifier receiving section or component, a vehicle identifier counting section or component, a communication congestion determining section or component and a system diagnosing section or component. Based on various signals from the two-way wireless communications system 21, the global positioning system 23 and the navigation system 24, these sections or components will determine a congestion condition of the DSRC system and will determine system failure of the vehicle on-board unit 12. More specifically, since the probability of data collision increases as the number of neighboring vehicles 10*a* transmitting DSRC signals within the communication region increases, localized congestion in DSRC system becomes high as the number of neighboring vehicles 10*a* transmitting DSRC signals within the communication region increases. Therefore, the control unit 20 of the present invention is configured to determine the congestion condition of the DSRC system based on the number of vehicle identifiers relating to the neighboring vehicles 10*a* received within a first prescribed time period t1. Since a relative system capability of the DSRC system becomes low as the congestion condition of the DSRC system becomes high, the control unit 20 is configured to notify the relative system capability to the user of the vehicle on-board unit 12 based the congestion condition.

More specifically, the vehicle identifier receiving section is configured to receive neighboring vehicle identifiers relating to neighboring vehicles 10*a* located within a prescribed communication region around the host vehicle 10. The vehicle identifier counting section is configured to determine a number of the neighboring vehicle identifiers received by the vehicle identifier receiving section within the first prescribed time $t_1$. The communication congestion determining section is configured to determine the congestion condition of short range wireless communications within the prescribed communication region based on the number of the neighboring vehicle identifiers determined in the vehicle identifier counting section. Moreover, the system diagnosing section is configured to determine a system failure of the vehicle on-board unit 12 when the number of the neighboring vehicle identifiers determined in the vehicle identifier counting section exceeds a prescribed threshold value $N_3$ for a prescribed diagnostic period $t_2$.

The two-way wireless communications system 21 includes communication interface circuitry that connects and exchanges information with a plurality of the vehicles 10 that are similarly equipped as well as with the roadside units 16 through a wireless network within the broadcast range of the host vehicle 10. The two-way wireless communications system 21 is configured and arranged to conduct direct two way communications between vehicles (vehicle-to-vehicle communications) and roadside units (roadside-to-vehicle communications). Moreover, the two-way wireless communications system 21 is configured to periodically broadcast a signal in the broadcast area. The two-way wireless communications system 21 is an on-board unit that has both an omni-directional antenna and a multi-directional antenna. Thus, the two way wireless communications system 21 preferably constitutes a short range wireless broadcasting section configured to broadcast a host vehicle identifier of the host vehicle 10.

In particular, the two-way wireless communications system 21 is preferably a dedicated short range communications (DSRC) systems, since the latency time between communications is very low compared to most other technologies that are currently available. However, other two-way wireless communications systems can be used if they are capable of conducting both point-to-point wireless communications and broadcast wireless messages in a limited broadcast area so log as the latency time between communications is short enough. When the two-way wireless communications system 21 is a DSRC system, the two-way wireless communications system 21 will transmit at a 75 Mhz spectrum in a 5.9 GHz band with a data rate of 1 to 54 Mbps, and a maximum range of about 1,000 meters. Preferably, the two-way wireless communications system 21 includes seven (7) non-overlapping channels. The two-way wireless communications system 21 will be assigned a Medium Access Control (MAC) address and/or an IP address so that each vehicle in the network can be individually identified.

The two-way wireless communications system 21 is configured to periodically broadcast a standard or common message set (CMS) to the neighboring vehicles 10*a* and the nearby roadside units 16 within a prescribed broadcast range of the host vehicle 10. This common message set (CMS) would mostly likely be developed such that all of the DSRC equipped vehicles 10 and 10*a* would transmit the same type of vehicle parameter identifiers to give relevant kinematical and location information. In other words, preferably a standardized DSRC message set and data dictionary would be established for safety applications that utilize vehicle-to-vehicle and/or vehicle-to-infrastructure communications. For example, the common message set can include preset vehicle parameter identifiers, such as a MAC address, an IP address and/or a vehicle ID number, and variable vehicle parameter identifiers indicative of vehicle location and movement such as a GPS location/vehicle position (longitude, latitude and elevation) with a GPS time stamp, a vehicle heading, and/or a vehicle speed.

Figure 4:
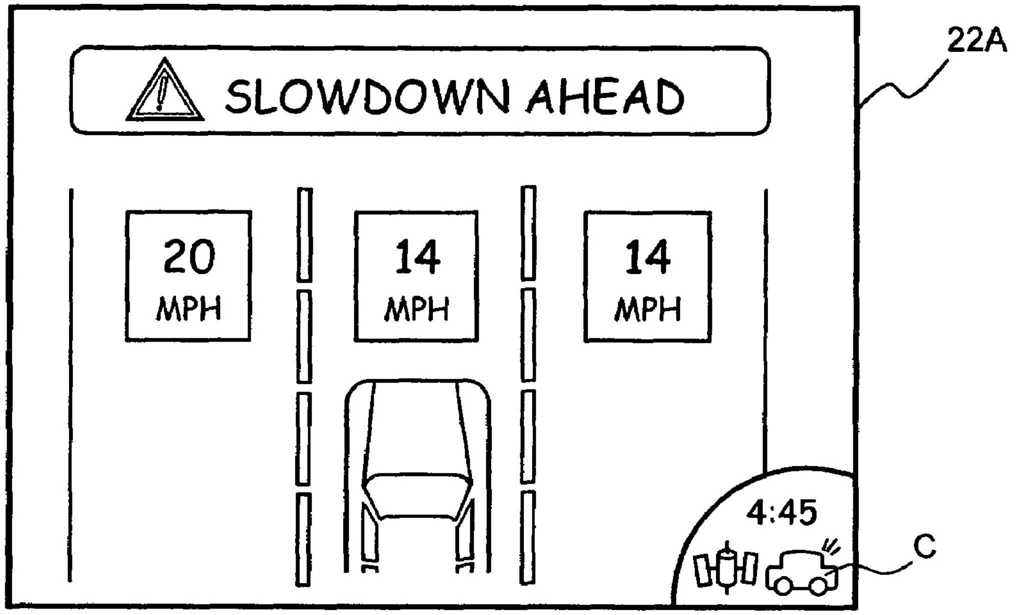
FIG. 4 is a simplified view of a display screen of the vehicle on-board unit illustrating an example of a congestion condition icon displayed in the display screen in accordance with the present invention.

The display section 22 preferably includes a color display screen 22A and an input controls 22B. The display section 22 constitutes a human machine interface by which the user interacts with the vehicle on-board unit 12. Thus, the display section 22 is configured and arranged to allow the vehicle on-board unit 12 to inform the user by using the display screen 22A, and to allow the user to control the vehicle on-board unit 12 by accepting user input through the input controls 22B. The display section 22 is configured and arranged to display the relative system capability based on the congestion condition determined by the control unit 20 as discussed below. More specifically, in the preferred embodiment of the present invention, the display section 22 includes a congestion condition icon C for indicating the relative system capability of the DSRC system based on the congestion condition. FIG. 4 illustrates an example of the display shown in the display screen 22A with the congestion condition icon C. The congestion condition icon C uses different colors (e.g., green, yellow, orange, and red) for indicating the congestion condition depending on the congestion condition determined by the control unit 20.

Figure 5A:
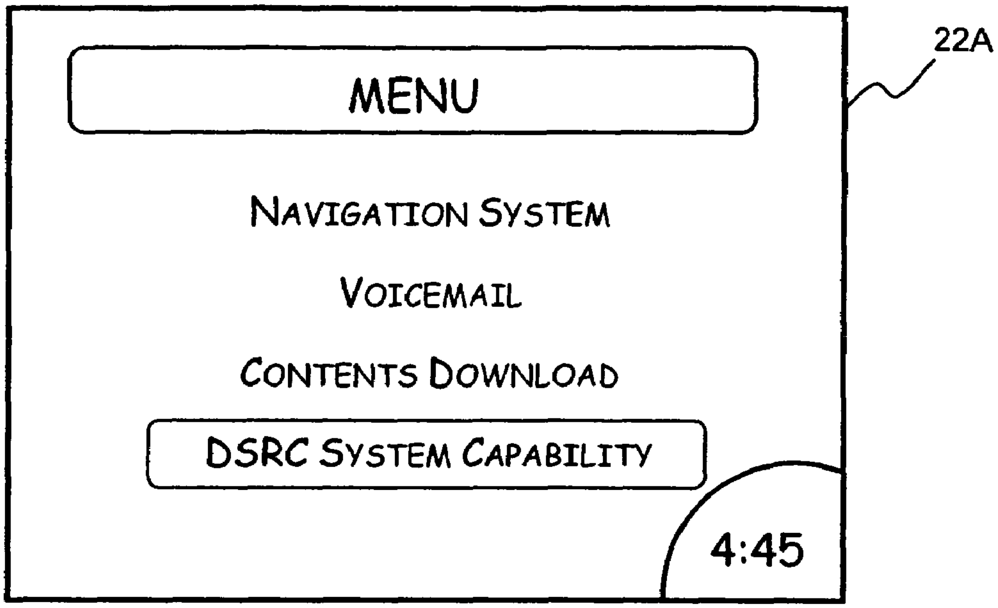
FIGS. 5(A) and 5(B) are simplified views of the display screen of the vehicle on-board unit illustrating examples of system diagnostics screen implementation in accordance with the present invention.
Figure 5B:
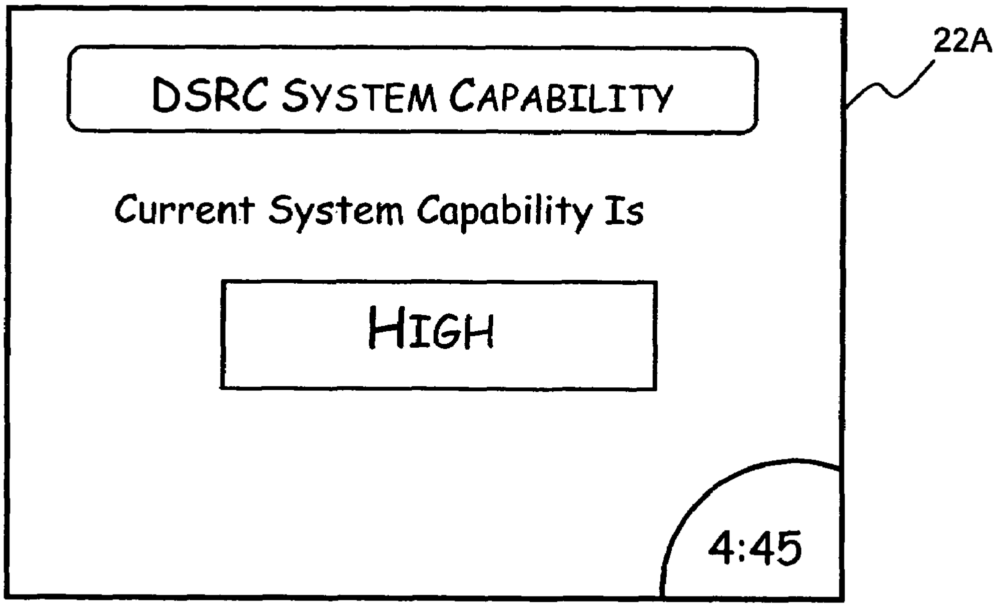

Although the example in FIG. 4 illustrates a case in which the relative system capability is indicated by using a top-level status icon implementation (e.g., the congestion condition icon C is constantly displayed in the display screen 22A when the display screen 22A is turned on), the present invention is not limited to such implementation. For example, FIGS. 5(A) and 5(B) illustrate examples of an implementation using a second or third level diagnostics screen in which the user is provided with an option to see the system capability (FIG. 5(A)), and upon a request of the user, the vehicle on-board unit 12 displays the system capability in a colorized or non-colorized manner according to the congestion condition in the second or third level diagnostics screen in the display screen 22A (FIG. 5(B)). In addition, similarly to conventional cellular phones, the vehicle on-board unit 12 can be configured and arranged to demonstrate the system capability using an incrementally increasing number of status bars.

The global positioning system (GPS) 23 is preferably a conventional global positioning system that is configured and arranged to receive global positioning information of the host vehicle 10 in a conventional manner. Basically, the global positioning system 23 includes a GPS unit that is a receiver for receiving a signal from the global positioning satellite 14 via a GPS antenna. The signal transmitted from the global positioning satellite 14 is received at regular intervals (e.g. one second) to detect the present position of the host vehicle 10. The GPS system 23 preferably has an accuracy of indicting the actual vehicle position within a few meters or less. This data (present position of the host vehicle) is fed to the control unit 20 for processing and to the navigation system 24 for processing.

The navigation system 24 is preferably a conventional navigation system that is configured and arranged to receive global positioning information of the host vehicle 10 in a conventional manner. The navigation system 24 is preferably operatively coupled to the display section 22. The navigation system 24 can have its own controller with microprocessor and storage, or the processing for the navigation system 24 can be executed by the control unit 20. In either case, the signals transmitted from the global positioning satellites 14 are utilized to guide the vehicle 10 in a conventional manner. The navigation system 23 preferably has a map database storage unit configured to store road map data as well as other data that can be associated with the road map data such as various landmark data, fueling station locations, restaurants, etc.

Since it is desirable to have the position information as accurate as possible for the vehicles 10 and 10*a*, the global positioning system 23 can be used together with the navigation system 24 and/or the map database storage unit of the navigation system 23 to enhance the accuracy of the data.

Accordingly, in the present invention, the vehicle on-board unit 12 is configured and arranged to receive the neighboring vehicle identifiers relating to neighboring vehicles 10*a* located within a prescribed DSRC region around the host vehicle 10 within the first prescribed time $t_1$ by using the two-way communications system 21. Then, the control unit 20 of the vehicle on-board unit 12 is configured to determine the congestion condition within the prescribed DSRC region based on the number of the neighboring vehicle identifiers received. Once the congestion condition is determined, the vehicle on-board unit 12 is configured and arranged to inform the user of the vehicle on-board unit 12 of the relative system capability according to the congestion condition by using the colorized congestion condition icon C in the display section 22.

In the preferred embodiment of the present invention, the color of the congestion condition icon C will be changed based on the number of the neighboring vehicle identifiers received. If the number of vehicle identifiers exceeds certain threshold values, the congestion condition icon will turn from green to yellow, from yellow to orange, and from orange to red based on a set of criteria. When the number of the neighboring vehicle identifiers received in the first prescribed time $t_1$ drops below the threshold values again, the congestion condition icon C will climb back from red to orange, from orange to yellow, from yellow to green to demonstrate that the DSRC system is at full strength.

In the present invention, the vehicle identifier is information that can be used to distinguish a signal transmitted from one neighboring vehicle 10*a* from a signal transmitted from another neighboring vehicle 10*a*. Moreover, the vehicle identifier is preferably information included in the common message set broadcasted by the neighboring vehicle 10*a*. For example, in the preferred embodiment of the present invention, the MAC address that is uniquely assigned to each neighboring vehicle 10*a* will be used as the vehicle identifier. Of course, it will be apparent to those skilled in the art from this disclosure that the vehicle identifier is not limited to the MAC address. Rather, any information transmitted from the neighboring vehicle 10*a* that identifies one neighboring vehicle 10*a* from another can be used as the vehicle identifier.

The vehicle on-board unit 12 is also configured to determine the system failure when the number of the vehicle identifiers determined in the vehicle identifier counting section exceeds the prescribed threshold value $N_3$ (i.e., when the congestion condition icon C remains red) for the second prescribed time $t_2$.

Figure 6:
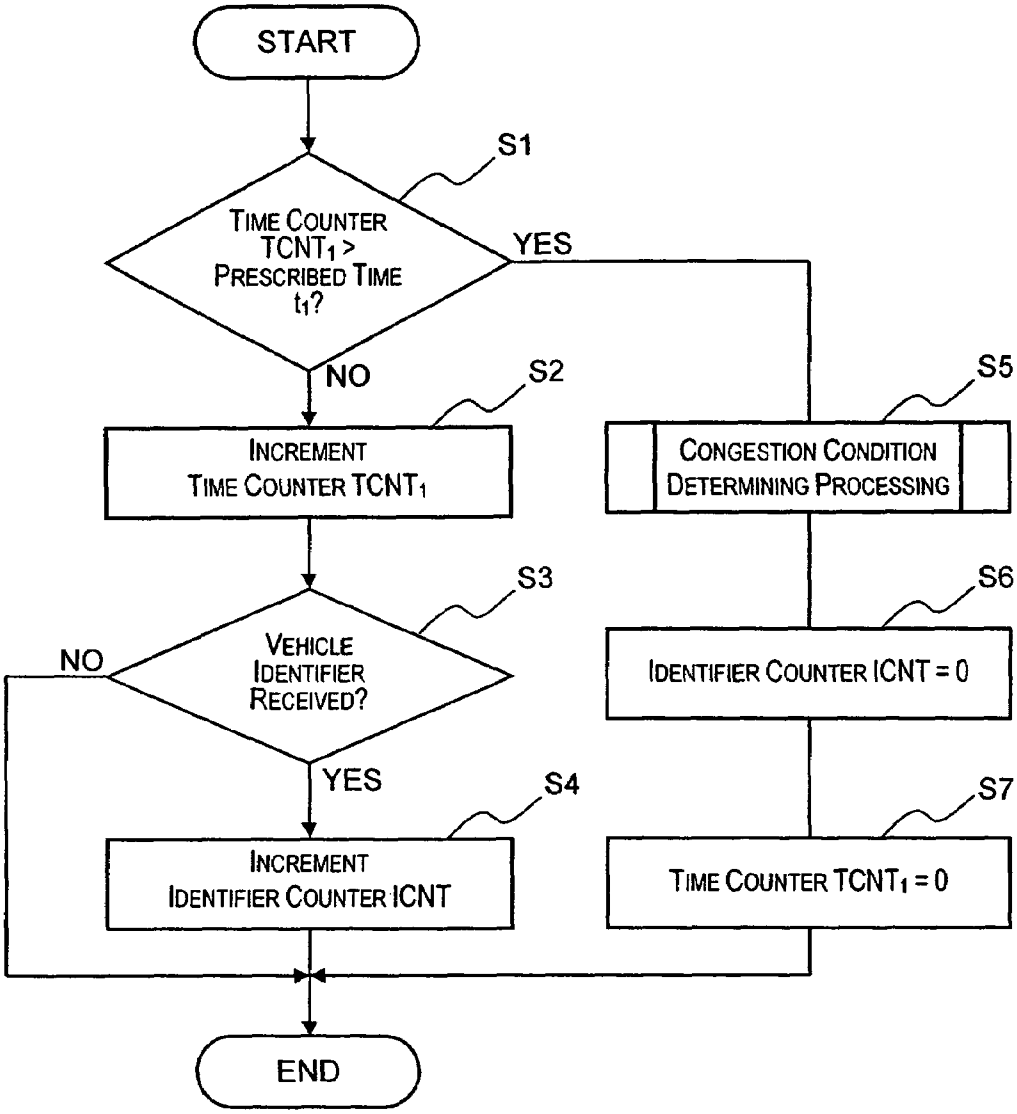
FIG. 6 is a flowchart describing the control processing executed in a control unit of the vehicle on-board unit for receiving the vehicle identifiers relating to neighboring vehicles in accordance with the present invention.

Referring now to the flowchart of FIG. 6, the control processing executed in the control unit 20 for receiving the vehicle identifiers of the neighboring vehicles 10*a* will be explained.

In step S1, the control unit 20 is configured to check whether a value of a first time counter $TCNT_1$ is greater than the prescribed time $t_1$. The prescribed time $t_1$ is preferably set to a time period that is sufficient to receive majority of the vehicle identifiers of the neighboring vehicles 10*a* within the prescribed communication region around the host vehicle 10.

If the first time counter $TCNT_1$ is not greater than the first prescribed time $t_1$ (NO in step S1), the control unit 20 is configured to proceed to step S2, and to increment the first time counter $TCNT_1$. Then, the control unit 20 is configured to proceed to step S3. In step S3, the control unit 20 is configured to determine whether a new vehicle identifier(s) has been received. More specifically, in the preferred embodiment of the present invention, the control unit 20 is configured to determine whether a new MAC address(es) with a valid security certificate has been received from the neighboring vehicle 10*a* since the last control cycle. If the control unit 20 determines that the new vehicle identifier(s) has been received in step S3 (YES in step S3), the control unit 20 is configured to proceed to step S4. In step S4, the control unit 20 is configured to increment an identifier counter ICNT by a number of the new MAC address(es) received since the last control cycle. Then, the control unit 20 is configured to end this control cycle. If the control unit 20 determines that the new vehicle identifier has not been received in step S3 (NO in step S3), the control unit 20 is configured to end this control cycle. In the subsequent control cycles, the control unit 20 is configured to repeat the processing of steps S1 to S4 until the first prescribed time $t_1$ elapses (i.e., until the first time counter $TCNT_1$ becomes greater than the first prescribed time $t_1$).

On the other hand, if the value of the first time counter $TCNT_1$ is greater than the first prescribed time $t_1$ in step S1 (YES in step S1), the control unit 20 is configured to proceed to step S5. In step S5, the control unit 20 is configured to execute the congestion condition determining processing, which is explained in more detail below referring to the flowchart of FIG. 7. Then, the control unit 20 is configured to initialize the identifier counter ICNT (i.e., ICNT=0) in step S6, and to initialize the first time counter $TCNT_1$ (i.e., $TCNT_1=0$) in step S7. Then, the control unit 20 is configured to end this control cycle.

Figure 7:
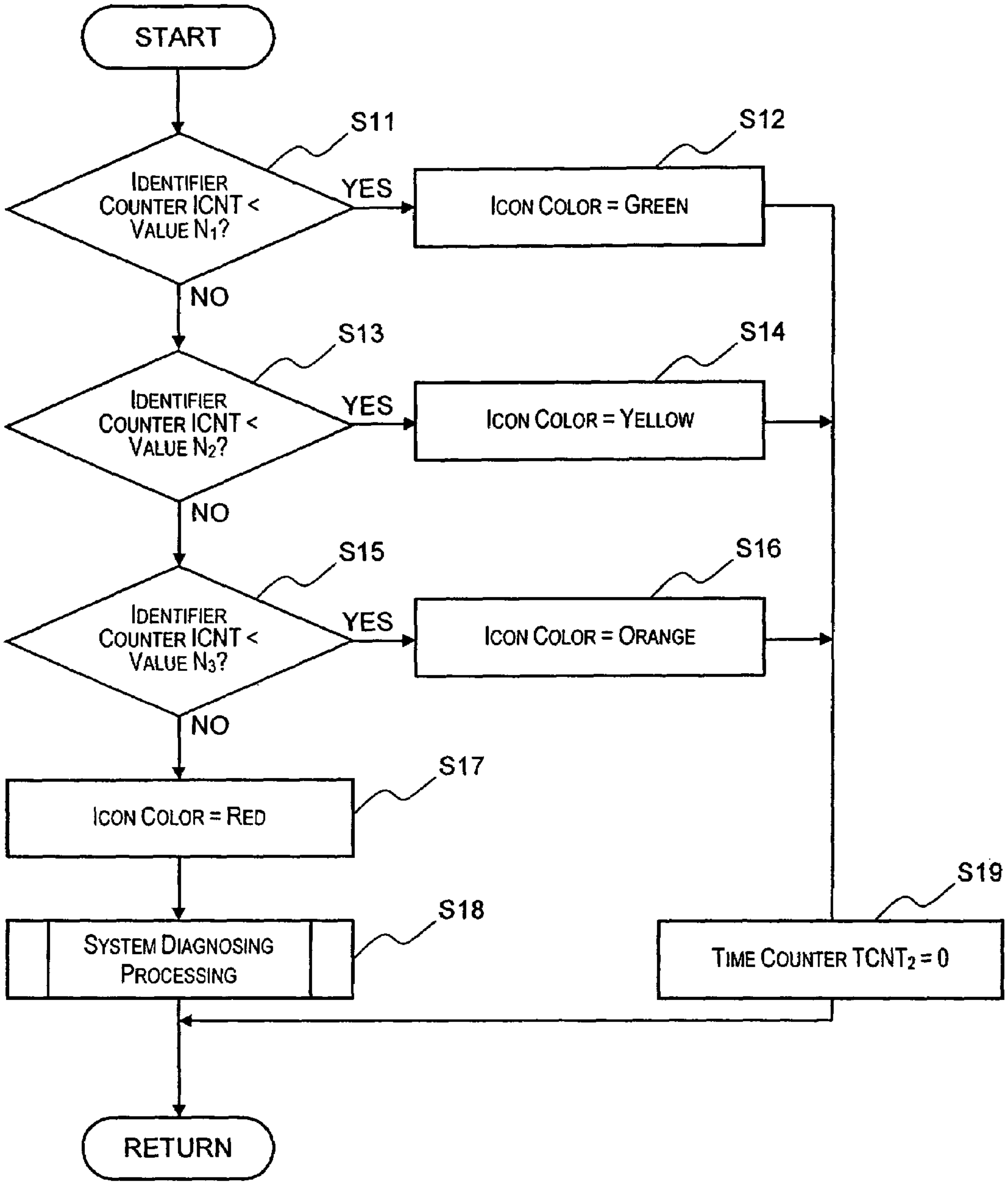
FIG. 7 is a flowchart describing the control processing executed in the control unit of the vehicle on-board unit for determining a congestion condition in accordance with the present invention.
Figure 8:
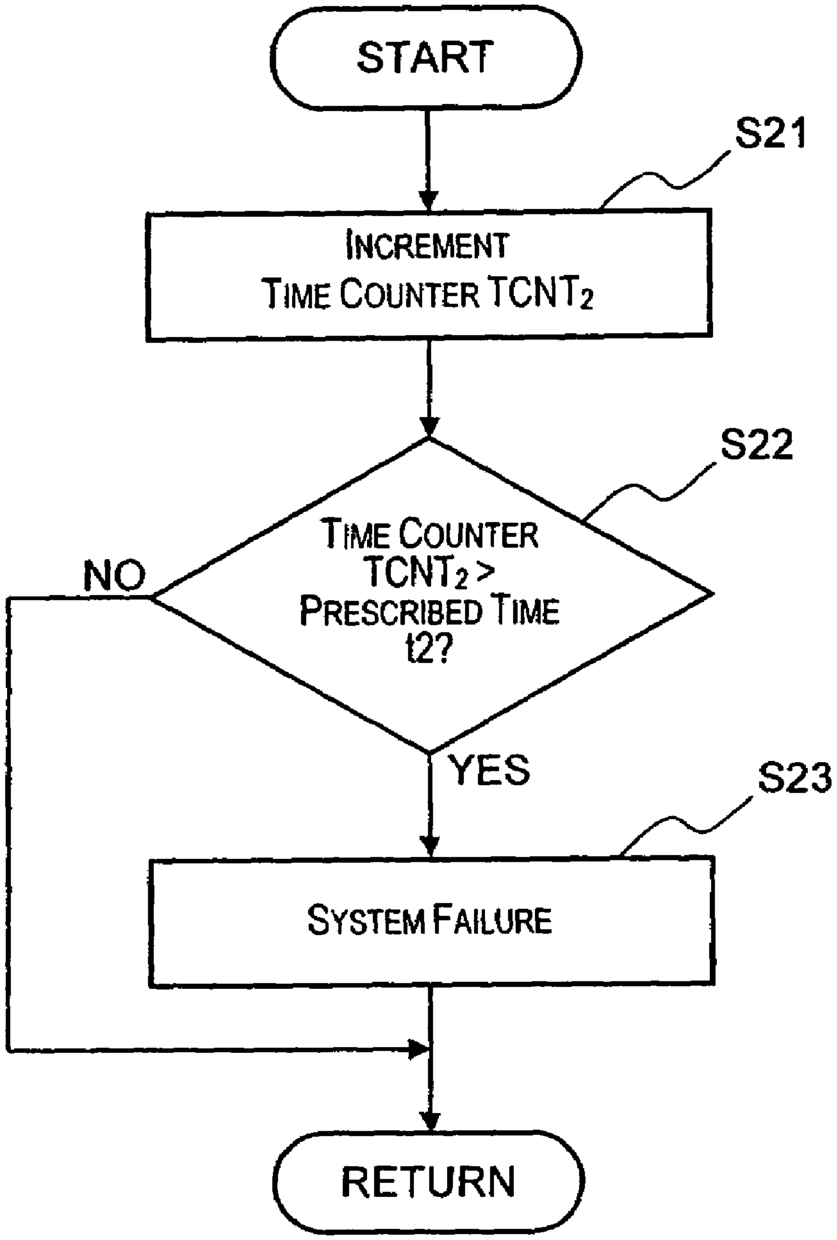
FIG. 8 is a flowchart describing the control processing executed in the control unit of the vehicle on-board unit for determining system failure in accordance with the present invention.

Referring now to FIG. 7, the congestion condition determining processing executed in the control unit 20 in step S5 of FIG. 6 will be explained in more detail.

In step S11, the control unit 20 is configured to determine whether the value of the identifier counter ICNT is smaller than a first threshold value $N_1$. The first threshold value $N_1$ is preferably set according to various factors (e.g., a range of the DSRC communication region) to a value that is low enough to ensure optimum DSRC operations. If the value of the identifier counter ICNT is smaller than the first threshold value $N_1$ in step S11 (YES in step S11), the control unit 20 is configured to proceed to step S12. In step S12, the control unit 20 is configured to set the color of the congestion condition icon C to green. Upon step S12 being executed, the color of the congestion condition icon C in the display screen 22A is changed to green.

On the other hand, if the value of the identifier counter ICNT is not smaller than the first threshold value $N_1$ in step S11 (NO in step S11), the control unit 20 is configured to proceed to step S13. In step S13, the control unit 20 is configured to determine whether the value of the identifier counter ICNT is smaller than a second threshold value $N_2$, which is larger than the first threshold value $N_1$. If the value of the identifier counter ICNT is smaller than the second threshold value $N_2$ in step S13 (YES in step S13), the control unit 20 is configured to proceed to step S14. In step S14, the control unit 20 is configured to set the color of the congestion condition icon C to yellow. Upon step S14 being executed, the color of the congestion condition icon C in the display screen 22A is changed to yellow.

On the other hand, if the value of the identifier counter ICNT is not smaller than the second threshold value $N_2$ in step S13 (NO in step S13), the control unit 20 is configured to proceed to step S15. In step S15, the control unit 20 is configured to determine whether the value of the identifier counter ICNT is smaller than a third threshold value $N_3$, which is larger than the second threshold value $N_2$. The third threshold value $N_3$ is preferably set according to various factors (e.g., a range of the DSRC communication region) to a value that indicates the DSRC system experiences a localized high congestion condition. If the value of the identifier counter ICNT is smaller than the third threshold value $N_3$ in step S15 (YES in step S15), the control unit 20 is configured to proceed to step S16. In step S16, the control unit 20 is configured to set the color of the congestion condition icon C to orange. Upon step S16 being executed, the color of the congestion condition icon C in the display screen 22A is changed to orange.

On the other hand, if the value of the identifier counter ICNT is not smaller than the third threshold value $N_3$ in step S15 (NO in step S13), the control unit 20 is configured to proceed to step S17. In step S17, the control unit 20 is configured to set the color of the congestion condition icon C to red. Upon step S16 being executed, the color of the congestion condition icon C in the display screen 22A is changed to red. Then, the control unit 20 is configured to execute the system diagnosing processing in step S18, which will be explained in more detail below with referring to the flowchart of FIG. 8. Then, the control unit 20 is configured to end the congestion condition determining processing.

Also, after executing step S12, S14, or S16, the control unit 20 is configured to proceed to step S19 and to initialize a second time counter $TCNT_2$ (i.e., $TCNT_2$=0). The second time counter $TCNT_2$ is a counter used in the system diagnosing processing as discussed below. Then, the control unit 20 is configured to end the congestion condition determining processing.

As explained above, upon the color of the congestion condition icon C being set to red in step S17 of FIG. 7, the control unit 20 is configured to execute the system diagnosing processing for determining the system failure of the vehicle on-board unit 12 in step S18. Referring now to the flowchart of FIG. 8, the system diagnosing processing executed in the control unit 20 in step S18 of FIG. 7 will be explained in more detail.

In step S21, the control unit 20 is configured to increment the second time counter $TCNT_2$, and to proceed to step S22. In step S22, the control unit 20 is configured to determine whether a value of the second time counter $TCNT_2$ is greater than the second prescribed time $t_2$. The second prescribed time $t_2$ is preferably set to a time period that is sufficient to determine an abnormality or failure of the vehicle on-board unit 12.

If the value of the second time counter $TCNT_2$ is greater than the second prescribed time $t_2$ in step S22 (YES in step S22), the control unit 20 determines the color of the congestion condition icon C has continuously been in red over the second prescribed time $t_2$. In other words, the number of the vehicle identifiers received has continuously exceeded the third threshold value $N_3$ over the second prescribed time $t_2$. Thus, the control unit 20 is configured to issue a system failure warning to the user of the vehicle on-board unit 12.

On the other hand, if the value of the second time counter $TCNT_2$ is not greater than the second prescribed time $t_2$ in step S22 (NO in step S22), the control unit 20 is configured to end the system diagnosing processing.

Accordingly, with the vehicle on-board unit 12 of the preferred embodiment, the congestion condition of the DSRC system can be determined based on the number of the vehicle identifiers (e.g., the MAC addresses) received from the neighboring vehicles 10*a* within the first prescribed time $t_1$. Then, the vehicle on-board unit 12 is configured to inform the relative system capability by varying the colorized congestion condition icon C displayed in the display screen 22A based on the congestion condition. Thus, the congestion condition icon C can help to explain when specific applications using the DSRC system potentially requiring a longer range (e.g., a wrong-way alert application) provide the message in later-than-normal timing by concluding the other vehicle's heartbeat message has either a low power or infrequent update rate based on the color of the congestion condition icon C.

Moreover, the vehicle on-board unit 12 of the present invention is further configured to provide diagnostics of the DSRC system if the congestion condition icon C remained red for over the second prescribed time $t_2$ (i.e., the number of vehicle identifiers received exceeded the third threshold value $N_3$ for over the second prescribed time $t_2$).

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle on-board unit comprising:

a short range wireless broadcasting section configured to broadcast a host vehicle identifier of a host vehicle equipped with the vehicle on-board unit;

a vehicle identifier receiving section configured to receive neighboring vehicle identifiers relating to neighboring vehicles located within a prescribed communication region around the host vehicle;

a vehicle identifier counting section configured to determine a number of the neighboring vehicle identifiers received by the vehicle identifier receiving section within a prescribed period of time; and a communication congestion determining section configured to determine a congestion condition of short range wireless communications within the prescribed communication region based on the number of the neighboring vehicle identifiers determined in the vehicle identifier counting section.

2. The vehicle on-board unit as recited in claim 1, further comprising a display section configured and arranged to display the congestion condition determined by the communication congestion determining section.

3. The vehicle on-board unit as recited in claim 2, wherein the display section includes a congestion condition icon that uses different colors for indicating the congestion condition depending on the congestion condition determined by the communication congestion determining section.

4. The vehicle on-board unit as recited in claim 3, wherein the display section is further configured and arranged to selectively display the congestion condition icon with a first color when the congestion condition is such that the number of the neighboring vehicle identifiers is smaller than a first threshold value and with a second color when the congestion condition is such that the number of the neighboring vehicle identifiers is equal to or greater than the first threshold value.

5. The vehicle on-board unit as recited in claim 4, wherein the display section is further configured and arranged to selectively display the congestion condition icon with the second color when the congestion condition is such that the number of the neighboring vehicle identifiers is smaller than a second threshold value that is larger than the first threshold value, and with a third color when the congestion condition is such that the number of the neighboring vehicle identifiers is equal to or greater than the second threshold value.

6. The vehicle on-board unit as recited in claim 2, wherein the display section is configured and arranged to constantly display the congestion condition determined by the communication congestion determining section while the display section is turned on.

7. The vehicle on-board unit as recited in claim 6, wherein the display section includes a congestion condition icon that uses different colors for indicating the congestion condition depending on the congestion condition determined by the communication congestion determining section.

8. The vehicle on-board unit as recited in claim 7, wherein the display section is further configured and arranged to selectively display the congestion condition icon with a first color when the congestion condition is such that the number of the neighboring vehicle identifiers is smaller than a first threshold value and with a second color when the congestion condition is such that the number of the neighboring vehicle identifiers is equal to or greater than the first threshold value.

9. The vehicle on-board unit as recited in claim 8, wherein the display section is further configured and arranged to selectively display the congestion condition icon with the second color when the congestion condition is such that the number of the neighboring vehicle identifiers is smaller than a second threshold value that is larger than the first threshold value, and with a third color when the congestion condition is such that the number of the neighboring vehicle identifiers is equal to or greater than the second threshold value.

10. The vehicle on-board unit as recited in claim 9, wherein the vehicle identifier receiving section is configured to receive physical hardware addresses relating to the neighboring vehicles as the neighboring vehicle identifiers.

11. The vehicle on-board unit as recited in claim 9, wherein the vehicle identifier receiving section is configured to receive Medium Access Control addresses of vehicle on-board units mounted to the neighboring vehicles as the neighboring vehicle identifiers.

12. The vehicle on-board unit as recited in claim 2, wherein the display section is configured and arranged to display the congestion condition determined by the communication congestion determining section upon a request by a user of the vehicle on-board unit.

13. The vehicle on-board unit as recited in claim 2, wherein the display section includes a plurality of congestion condition bars for indicating the congestion condition so that a number of the congestion condition bars displayed varies depending on the congestion condition determined by the communication congestion determining section.

14. The vehicle on-board unit as recited in claim 1, wherein the vehicle identifier receiving section is configured to receive physical hardware addresses relating to the neighboring vehicles as the neighboring vehicle identifiers.

15. The vehicle on-board unit as recited in claim 1, wherein the vehicle identifier receiving section is configured to receive Medium Access Control addresses of vehicle on-board units mounted to the neighboring vehicles as the neighboring vehicle identifiers.

16. The vehicle on-board unit as recited in claim 1, further comprising a system diagnosing section configured to determine a system failure when the number of the neighboring vehicle identifiers determined in the vehicle identifier counting section exceeds a prescribed number for a prescribed diagnostic period.

* * * * *